United States Patent
Ueyama

(10) Patent No.: US 12,024,169 B2
(45) Date of Patent: Jul. 2, 2024

(54) AUTOMATIC SPEED CONTROL DEVICE, AUTOMATIC SPEED CONTROL METHOD, AND AUTOMATIC SPEED CONTROL PROGRAM

(71) Applicant: TOYOTA JIDOSHA KABUSHIKI KAISHA, Toyota (JP)

(72) Inventor: Masao Ueyama, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 288 days.

(21) Appl. No.: 17/689,410

(22) Filed: Mar. 8, 2022

(65) Prior Publication Data
US 2022/0306103 A1    Sep. 29, 2022

(30) Foreign Application Priority Data
Mar. 25, 2021   (JP) .................................. 2021-052270

(51) Int. Cl.
*B60W 30/14* (2006.01)
*B60W 40/06* (2012.01)
*B60W 40/105* (2012.01)

(52) U.S. Cl.
CPC .......... *B60W 30/146* (2013.01); *B60W 40/06* (2013.01); *B60W 40/105* (2013.01);
(Continued)

(58) Field of Classification Search
CPC .. B60W 30/146; B60W 40/06; B60W 40/105; B60W 2520/105; B60W 2540/106; B60W 2552/05; B60W 2555/60
See application file for complete search history.

(56) References Cited

U.S. PATENT DOCUMENTS 7,260,465 B2 *  8/2007  Waldis ............... B60K 31/0058
                                                   340/905
8,055,427 B2 * 11/2011  Shin ...................... B60W 10/06
                                                   477/186
(Continued)

FOREIGN PATENT DOCUMENTS

JP    2000-293782 A   10/2000
JP    2003-063272 A    3/2003
(Continued)

OTHER PUBLICATIONS

Translation of SE-1450599-A1, 12 pages (Year: 2015).*
Translation of KR-20140016017-A, 7 pages (Year: 2014).*

*Primary Examiner* — Dale W Hilgendorf
(74) *Attorney, Agent, or Firm* — Oliff PLC

(57) ABSTRACT

An automatic speed control device includes: an upper limit speed setting part for setting a first speed as an upper limit speed during running on a main road and setting a second speed slower than the first speed as the upper limit speed during running on a connecting road; a target speed setting part for setting a target speed to less than or equal to the upper limit; and a speed control part for controlling a vehicle speed based on the target speed. The speed control part makes the vehicle accelerate according to a depression amount of the accelerator pedal when the pedal is depressed. The upper limit speed setting part sets the upper limit speed to a speed faster than the second speed and less than the first speed when the vehicle speed has become faster than the second speed due to depression of the pedal.

8 Claims, 6 Drawing Sheets

(52) U.S. Cl.
CPC . *B60W 2520/105* (2013.01); *B60W 2540/106* (2013.01); *B60W 2552/05* (2020.02); *B60W 2555/60* (2020.02)

(56) References Cited

U.S. PATENT DOCUMENTS

| | | | | |
|---|---|---|---|---|
| 9,738,280 | B2* | 8/2017 | Rayes | B60W 30/143 |
| 9,937,923 | B2* | 4/2018 | Custer | G08G 1/09623 |
| 11,214,257 | B2* | 1/2022 | Maus | G06V 20/588 |
| 2003/0045990 | A1 | 3/2003 | Adachi | |
| 2003/0204299 | A1* | 10/2003 | Waldis | B60K 31/0058 |
| | | | | 123/352 |
| 2010/0161195 | A1* | 6/2010 | Shin | B60W 10/18 |
| | | | | 701/93 |
| 2012/0316746 | A1* | 12/2012 | Park | G08G 1/052 |
| | | | | 701/93 |
| 2014/0025275 | A1* | 1/2014 | Kindel | B60K 35/00 |
| | | | | 701/93 |
| 2015/0100216 | A1* | 4/2015 | Rayes | G01S 13/867 |
| | | | | 701/96 |
| 2016/0009278 | A1* | 1/2016 | Roos | B60W 30/143 |
| | | | | 701/93 |
| 2016/0339913 | A1 | 11/2016 | Yamashita et al. | |
| 2018/0037223 | A1 | 2/2018 | Goto et al. | |
| 2018/0079410 | A1* | 3/2018 | Yamashita | B60W 30/143 |
| 2018/0126989 | A1* | 5/2018 | Krabot | B60W 40/04 |
| 2019/0241187 | A1* | 8/2019 | Maus | B60W 30/18163 |
| 2019/0367029 | A1* | 12/2019 | Martinez Ruvalcaba | B60W 50/082 |
| 2022/0144270 | A1 | 5/2022 | Takahama | |
| 2023/0360524 | A1* | 11/2023 | Karakayis | B60W 50/14 |

FOREIGN PATENT DOCUMENTS

| | | | | |
|---|---|---|---|---|
| JP | 2004-90788 | A | 3/2004 | |
| JP | 2009-120111 | A | 6/2009 | |
| JP | 2010-64613 | A | 3/2010 | |
| JP | 2015-157576 | A | 9/2015 | |
| JP | 2016-193666 | A | 11/2016 | |
| JP | 2016-215917 | A | 12/2016 | |
| KR | 20140016017 | A * | 2/2014 | B60W 2555/60 |
| SE | 1450599 | A1 * | 11/2015 | B60W 30/146 |
| WO | 2020/174920 | A1 | 9/2020 | |

* cited by examiner

AUTOMATIC SPEED CONTROL DEVICE, AUTOMATIC SPEED CONTROL METHOD, AND AUTOMATIC SPEED CONTROL PROGRAM

FIELD

The present disclosure relates to an automatic speed control device, automatic speed control method, and automatic speed control program.

BACKGROUND

In the past, an automatic speed control device for automatically controlling the speed of a vehicle to less than or equal to a preset upper limit speed has been proposed (JP 2003-063272 A, JP 2015-157576 A, JP 2016-215917 A, and JP 2000-293782 A). In particular, in the device described in JP 2003-063272 A, it has been studied to return the speed of a vehicle to for example an upper limit speed, if, during steady speed driving by an adaptive cruise control (ACC), the driver stops operating the accelerator after operating the accelerator to accelerate to greater than or equal to the upper limit speed.

SUMMARY

In this regard, a connecting road of a motorway (road connecting main roads or road between a main road and an ordinary road) is generally curved more sharply than the main road of a motorway and narrower in road width. For this reason, on a connecting road of a motorway, it is desirable to set the upper limit speed lower than on the main road of a motorway.

On the other hand, if the upper limit speed at a connecting road is automatically set lower than the upper limit speed of a main road, there is a possibility that the driver will feel the running speed on the connecting road is slow and will operate the accelerator so as to make the vehicle accelerate. However, if the accelerator finishes being operated, the speed of the vehicle will return to the upper limit speed for the connecting road, therefore the driver who feels the running speed on the connecting road is slow will have to constantly operate the accelerator while the vehicle is running on the connecting road, and will no longer be able to fully utilize the automatic control function of the vehicle speed.

In view of the above technical problem, an object of the present invention is to provide an automatic speed control device, etc., enabling the automatic control function of the vehicle speed to be sufficiently utilized even on a connecting road.

The present invention has as its gist the following.

(1) An automatic speed control device for automatically controlling a speed of a vehicle, the automatic speed control device comprising:
an upper limit speed setting part for setting a first speed as an upper limit speed when the vehicle is running on a main road of a motorway and setting a second speed slower than the first speed as the upper limit speed when the vehicle is running on a connecting road of the motorway;
a target speed setting part for setting a target speed to less than or equal to the upper limit based on the running environment of the vehicle; and
a speed control part for controlling a speed of the vehicle so as to become the target speed, wherein the speed control part controls the speed of the vehicle so that when an accelerator pedal of the vehicle is depressed, the vehicle accelerates by an acceleration degree corresponding to an amount of depression of the accelerator pedal regardless of the target speed, and
the upper limit speed setting part sets the upper limit speed while running on a connecting road to a speed faster than the second speed and less than or equal to the first speed when the speed of the vehicle has become faster than the second speed due to the accelerator pedal being depressed when the vehicle is running on the connecting road.

(2) The automatic speed control device according to above (1), wherein when the upper limit speed setting part sets the upper limit speed to a speed faster than the second speed while the vehicle is running on the connecting road and then the speed of the vehicle falls to less than or equal to the second speed while the vehicle is running on this connecting road, the upper limit speed setting part lowers the upper limit speed to the second speed.

(3) The automatic speed control device according to above (1) or (2), wherein the upper limit speed setting part sets the upper limit speed to a third speed slower than the second speed when the speed of the vehicle falls to less than or equal to the third speed when the vehicle is running on the connecting road.

(4) The automatic speed control device according to any one of above (1) to (3), wherein
the vehicle is a vehicle in which automatic control of the speed of the vehicle is stopped at an exit of the motorway, and
the upper limit speed setting part sets the upper limit speed to a fourth speed slower than the second speed, when the speed of the vehicle falls to less than or equal to the fourth speed when the vehicle is running on the connecting road heading to an exit.

(5) The automatic speed control device according to above (3), wherein
the vehicle is a vehicle in which automatic control of the speed of the vehicle is stopped at an exit of the motorway,
the upper limit speed setting part sets the upper limit speed to a fourth speed slower than the second speed when a speed of the vehicle falls to less than or equal to the fourth speed when the vehicle is running on the connecting road heading to an exit, and
the fourth speed is slower than the third speed.

(6) The automatic speed control device according to any one of above (1) to (5), wherein the upper limit speed setting part does not set the upper limit speed to a speed faster than the first speed regardless of the type of road on which the vehicle is running, even when a speed of the vehicle has become faster than the first speed due to the accelerator pedal being depressed.

(7) An automatic speed control method for automatically controlling a speed of a vehicle, the automatic speed control method comprising:
setting a first speed as an upper limit speed when the vehicle is running on a main road of a motorway, and setting a second speed slower than the first speed as the upper limit speed when the vehicle is running on a connecting road of the motorway;
setting a target speed to less than or equal to the upper limit based on the running environment of the vehicle; and controlling a speed of the vehicle so as to become the
target speed, wherein
a speed of the vehicle is controlled so that when an
accelerator pedal of the vehicle is depressed, the
vehicle accelerates by an acceleration degree corresponding to an amount of depression of the accelerator
pedal regardless of the target speed, and
an upper limit speed while running on a connecting road
is set to a speed faster than the second speed and less
than or equal to the first speed when the speed of the
vehicle has become faster than the second speed due to
the accelerator pedal being depressed when the vehicle
is running on the connecting road.
(8) An automatic speed control program for automatically
controlling a speed of a vehicle, the automatic speed
control program causing a computer to execute a process comprising:
setting a first speed as an upper limit speed when the
vehicle is running on a main road of a motorway, and
setting a second speed slower than the first speed as the
upper limit speed when the vehicle is running on a
connecting road of the motorway;
setting a target speed to less than or equal to the upper
limit based on the running environment of the vehicle;
controlling a speed of the vehicle so as to become the
target speed;
controlling a speed of the vehicle so that when an accelerator pedal of the vehicle is depressed, the vehicle
accelerates by an acceleration degree corresponding to
an amount of depression of the accelerator pedal
regardless of the target speed; and
setting upper limit speed while running on a connecting
road to a speed faster than the second speed and less
than or equal to the first speed when the speed of the
vehicle has become faster than the second speed due to
the accelerator pedal being depressed when the vehicle
is running on the connecting road.

DESCRIPTION OF EMBODIMENTS

Below, embodiments will be explained in detail referring
to the drawings. Note that, in the following explanation,
similar components are assigned the same reference notations.

Configuration of Vehicle

Figure 1:
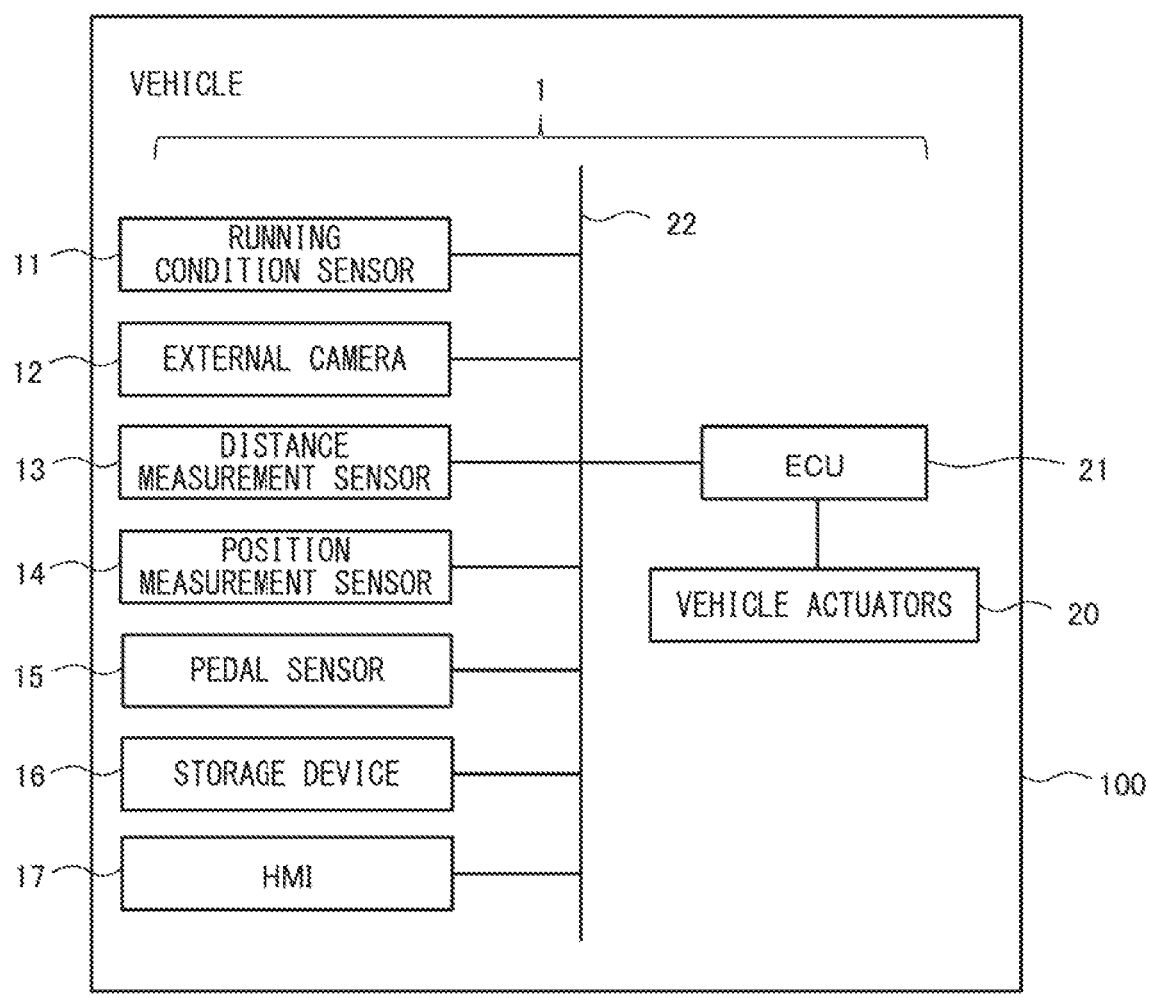
FIG. 1 is a view of the configuration schematically
showing a vehicle in which an automatic speed control
system according to one embodiment is mounted.

FIG. 1 is a view of the configuration schematically
showing a vehicle 100 in which an automatic speed control
system 1 according to one embodiment is mounted. The
automatic speed control system 1 is mounted in the vehicle
100, and automatically controls the speed of the vehicle 100
under predetermined circumstances. In the present embodiment, the automatic speed control system 1 has a running
condition sensor 11, external camera 12, distance measurement sensor 13, position measurement sensor 14, pedal
sensor 15, storage device 16, human machine interface
(below, referred to as "HMI") 17, vehicle actuators 20, and
an electronic control unit (below, referred to as "ECU") 21.

However, the automatic speed control system 1 need not
necessarily have all of them. For example, the automatic
speed control system 1 need not have the distance measurement sensor 13 if having the external camera 12.

The running condition sensor 11, external camera 12,
distance measurement sensor 13, position measurement sensor 14, pedal sensor 15, storage device 16, HMI 17, and
ECU 21 are connected to be able to communicate through an
internal network 22. The internal network 22 is a network
based on the CAN (Controller Area Network) or other
standard. Further, the ECU 21 is connected through signal
wires to the vehicle actuators 20.

The running condition sensor 11 is a sensor detecting the
running condition of the vehicle 100. The running condition
sensor 11 is, for example, an inertia measurement sensor,
and detects a speed, an acceleration degree, or the like of the
vehicle 100. The running condition sensor 11 outputs the
detection results of the running conditions of the vehicle
through the internal network 22 to the ECU 21.

The external camera 12 is a device for capturing an image
of the surroundings of the vehicle. The external camera 12
has a 2D detector (CCD, C-MOS, etc.) configured by an
array of photoelectric conversion devices having sensitivity
to visible light, and an image-forming optical system forming, on the 2D detector, an image of a region to be captured.
In the present embodiment, the external camera 12 is
attached for example inside the vehicle 100 so as to face
forward of the vehicle 100. The external camera 12 captures
the region in front of the vehicle 100 every predetermined
capturing period (for example 1/30 second to 1/10 second), and
generates an image showing that front region. The external
camera 12 outputs the generated image through the internal
network 22 to the ECU 21, every time generating an image.
Note that, the external camera 12 may be a single lens
camera or may be a stereo camera. If a stereo camera is used
as the external camera 12, the external camera 12 also
functions as a distance measurement sensor 13. The vehicle
100 may be provided with a plurality of external cameras
differing in capture direction or focal distance.

The distance measurement sensor 13 is a sensor measuring the distance to an object present in the surroundings of
the vehicle 100. In the present embodiment, the distance
measurement sensor 13 can also measure an azimuth of the
object present in the surroundings of the vehicle 100. The
distance measurement sensor 13 is, for example, a milliwave
radar or other radar, a LiDAR, or sonar. In the present
embodiment, the distance measurement sensor 13 measures
the distance to an object present in front of the vehicle. The
distance measurement sensor 13 outputs the measurement
result of the distance to an object in the surroundings, every
predetermined period, through the internal network 22.

The position measurement sensor 14 is a sensor measuring a self-position of the vehicle 100. The position measurement sensor 14 is, for example, a GNSS (Global Navigation Satellite System) receiver. The GNSS receiver
receives signals with time information from a plurality of
position measurement satellites, and measures the self-position of the vehicle 100 based on the received signals.
The position measurement sensor 14 outputs the self-position information of the vehicle 100, every predetermined period, through the internal network 22 to the ECU 21.

The pedal sensor 15 is a sensor attached to an accelerator pedal and a brake pedal (both not shown), and detecting amounts of depression of the accelerator pedal and the brake pedal by the driver. In the present embodiment, the pedal sensor 15 outputs the detected amount of depression of the accelerator pedal and the amount of depression of the brake pedal through the internal network 22 to the ECU 21.

The storage device 16 has, for example, a hard disk drive or a nonvolatile semiconductor memory. The storage device 16 stores map information. The map information includes, for every predetermined section of a road, information indicating the position of that section and road signs (for example, lane defining lines or stop lines). The storage device 16 reads out map information in accordance with a readout request of map information from the ECU 21, and transmits the map information through the internal network 22 to the ECU.

The HMI 17 notifies notification information received through the internal network 22 from the ECU 21 to the driver of the vehicle 100. Therefore, the HMI 17 functions as a notification device notifying that information to the driver. Specifically, the HMI 17 has, for example, a display device such as a liquid crystal display, a meter such as a speedometer, warning lights, or speakers. Further, the HMI 17 receives input from the occupants, and sends the received input through the internal network 22 to the ECU 21. Therefore, the HMI 17 functions as an input device for receiving input from a passenger or the driver. Specifically, the HMI 17 has a touch panel, switches, buttons, or a remote controller. The HMI 17 is, for example, provided at the instrument panel.

The vehicle actuators 20 are actuators used for controlling the operation of the vehicle 100. Specifically, the vehicle actuators 20 include, for example, a drive actuator for controlling an internal combustion engine or electric motor for driving the vehicle 100, and a brake actuator for controlling brakes braking the vehicle 100. The vehicle actuators 20 may also include a steering actuator for controlling steering of the vehicle 100. The vehicle actuators 20 control acceleration and braking of the vehicle 100, and control steering of the vehicle 100 when having a steering actuator, in accordance with control signals sent from the ECU 21 through signal wires.

Figure 2:
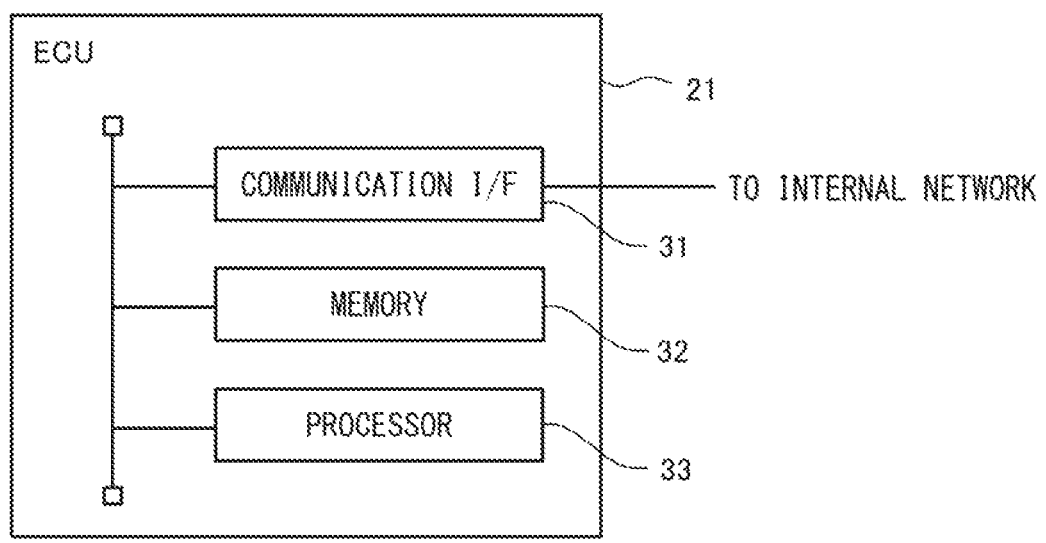
FIG. 2 is a view of a hardware configuration of an ECU
according to one embodiment.

FIG. 2 is a view of the hardware configuration of the ECU 21 according to one embodiment. The ECU 21 has a communication interface 31, memory 32, and processor 33. Note that, the communication interface 31, memory 32, and processor 33 may be separate circuits, or may be configured as a single integrated circuit.

The communication interface 31 has a communication interface circuit and a device interface circuit. The communication interface circuit is a circuit for connecting the ECU 21 to the internal network 22. The device interface circuit is a circuit for outputting control signals to the vehicle actuators 20.

The communication interface 31 transmits received detection results of the running conditions of the vehicle 100 to the processor 33, each time receiving detection results from the running condition sensor 11. Further, it sends a received image to the processor 33, each time receiving an image from the external camera 12. In addition, the communication interface 31 transmits measurement results of the distance to an object in the surroundings of the vehicle to the processor 33, each time receiving measurement results from the distance measurement sensor 13. Furthermore, the communication interface 31 transmits the measurement results of the self-position to the processor 33, each time receiving the measurement results from the position measurement sensor 14. Further, the communication interface 31 transmits the detection results to the processor 33, every time receiving the detection results from the pedal sensor 15. The communication interface 31 transmits a high precision map read from the storage device 16 to the processor 33. In addition, the communication interface 31 transmits the input signal of an occupant to the processor 33, every time receiving the input signal from the HMI 17. Furthermore, the communication interface 31 transmits information for notifications to the HMI 17, every time receiving such information from the ECU 21. In addition, the communication interface 31 transmits control signals to the vehicle actuators 20, every time receiving such control signals to the vehicle actuators 20 from the ECU 21.

The memory 32 is a storage device for storing data. The memory 32 includes, for example, a volatile semiconductor memory and a nonvolatile semiconductor memory. The memory 32 stores a program for the automatic speed control processing performed by the processor 33 of the ECU 21. Further, the memory 32 stores images captured by the external camera 12, operating information by the driver, measurement results of the distance to an object in the surroundings of the vehicle, measurement results of the self-position, input information of the occupants, and various types of data used in the automatic speed control processing.

The processor 33 has one or more CPUs (central processing units) and their peripheral circuits. The processor 33 may further have a logic unit or arithmetic unit or other such processing circuit. The processor 33 performs various types of processing, based on computer programs stored in the memory 32. In particular, the processor 33 performs control processing of the vehicle actuators 20 to control the vehicle actuators 20. In the present embodiment, the processor 33 functions as an automatic speed control device for automatically controlling the speed of the vehicle 100.

Figure 3:
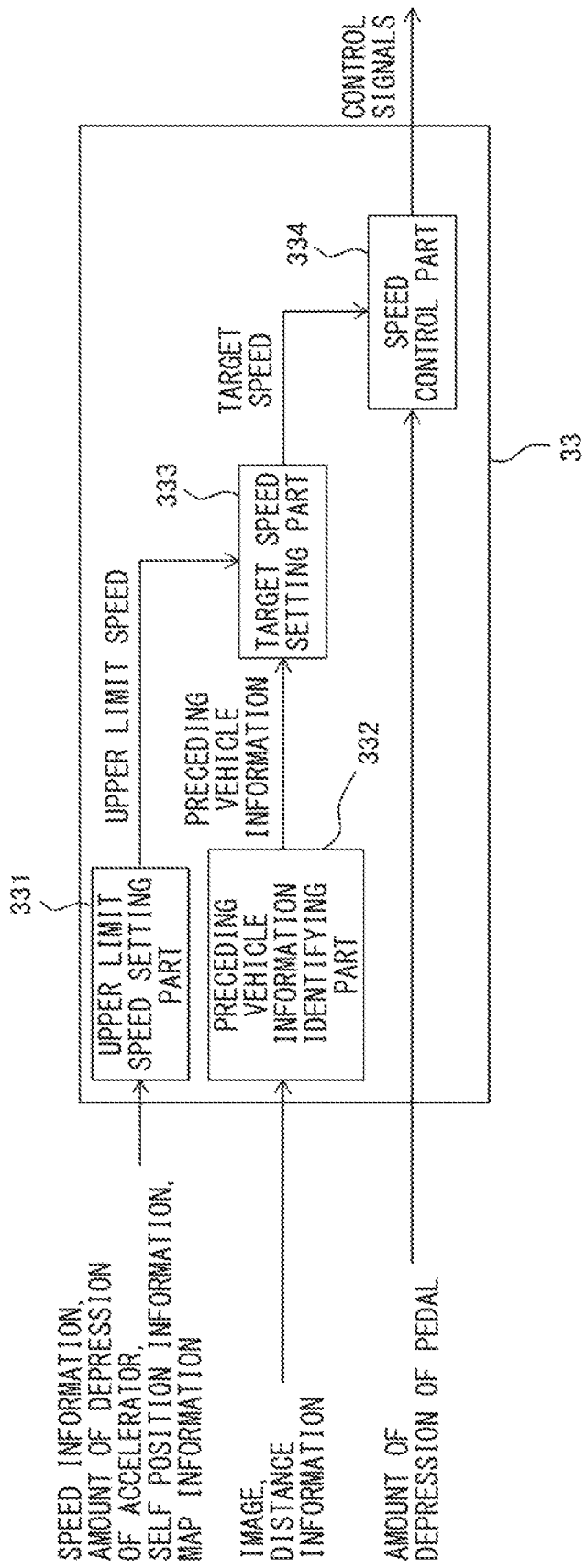
FIG. 3 is a functional block diagram of a processor of the
ECU.

FIG. 3 is a functional block diagram of the processor 33 of the ECU 21. As shown in FIG. 3, the processor 33 has an upper limit speed setting part 331 for performing upper limit speed setting processing for setting an upper limit speed of the vehicle 100, a preceding vehicle information identifying part 332 for identifying preceding vehicle information including the presence and speed of a preceding vehicle running in the same lane as the vehicle 100 and the following distance between the vehicle 100 and the preceding vehicle, a target speed setting part 333 for performing target speed setting processing for setting a target speed of less than or equal to the upper limit speed based on the running environment of the vehicle 100, and a speed control part 334 for performing speed control processing for controlling the speed of the vehicle 100 so as to become the target speed. These functional blocks of the processor 33 are functional modules realized by for example a computer program running on the processor 33. Alternatively, these functional blocks of the processor 33 may be dedicated processing circuits provided at the processor 33.

Automatic Speed Control Processing

Next, automatic speed control processing of the vehicle 100 by the automatic speed control device according to the present embodiment will be explained. If the automatic speed control processing is performed, the automatic speed control device automatically controls the speed of the vehicle 100 even without the driver operating the accelerator or the brakes. The automatic control of the speed of the vehicle 100 according to the automatic speed control processing here may be control requiring monitoring by the driver (for example, adaptive cruise control (ACC)) or may be part of automated driving control not requiring monitoring by the driver. Further, the processor 33 may also automatically control the steering of the vehicle 100 so that the vehicle 100 automatically runs along the lane on which the vehicle is currently running, when the driver selects automatic speed control.

In the present embodiment, the automatic speed control by the automatic speed control processing is performed, while the vehicle 100 is running on a motorway (for example, highway or other road where main roads are connected not by intersections having traffic lights, but by connecting roads at interchanges, junctions, or the like.) The automatic speed control processing in the present embodiment is, for example, started by the driver selecting automatic speed control through the HMI 17. Alternatively, the automatic speed control processing may also be automatically started if the vehicle 100 passes through an entrance to the motorway. On the other hand, the driver takes over operation for the speed control and the automatic speed control processing is ended when the vehicle 100 passes through an exit of the motorway.

Note that, the automatic steering control processing for automatically controlling the steering of the vehicle 100 may also be started and ended simultaneously with the start and end of the automatic speed control processing. In this case, when the vehicle 100 passes through the exit of the motorway, the driver takes over operation for the steering control and the automatic steering control processing is ended.

Specifically, the automatic speed control processing by the processor 33 includes the upper limit speed setting processing performed by the upper limit speed setting part 331, the preceding vehicle information identifying processing performed by the preceding vehicle information identifying part 332, the processing for setting a target speed performed by the target speed setting part 333, and the speed control processing performed by the speed control part 334.

As shown in FIG. 3, the upper limit speed setting part 331 receives, as input, the speed of the vehicle 100 detected by the running condition sensor 11, the amount of depression of the accelerator pedal detected by the pedal sensor 15, the self-position of the vehicle 100 measured by the position measurement sensor 14, and map information stored in the storage device 16. The upper limit speed setting part 331 performs the upper limit speed setting processing, based on such input information, to output the upper limit speed of the vehicle 100 at that point of time. Details of the upper limit speed setting processing will be explained later.

The preceding vehicle information identifying part 332 receives, as input, the image information captured by the external camera 12 and/or distance information obtained by the distance measurement sensor 13. The preceding vehicle information identifying part 332 identifies the preceding vehicle information, based on such input information. The preceding vehicle information includes the presence of any preceding vehicle running in the same lane as the vehicle 100, the speed of the preceding vehicle if there is a preceding vehicle, and the following distance between the vehicle 100 and this preceding vehicle.

Specifically, the preceding vehicle information identifying part 332 first recognizes other vehicles running around the vehicle 100, based on images captured by the external camera 12 or distance information obtained by the distance measurement sensor 13. The other vehicles are recognized by known pattern recognition techniques such as a neural network (NN) or a support vector machine (SVM). In addition, the preceding vehicle information identifying part 332 recognizes dividing lines shown in the images captured by the external camera 12, and recognizes the position of the lane in which the vehicle 100 is running based on the positions of the recognized dividing lines. Alternatively, the preceding vehicle information identifying part 332 may recognize the position of the lane in which the vehicle 100 is running based on the self-position information measured by the position measurement sensor 14 and map information stored in the storage device 16. Then, the preceding vehicle information identifying part 332 identifies a preceding vehicle in the lane in which the vehicle 100 is running, based on the positional relationship between the recognized dividing lines and the recognized other vehicles (if there is no preceding vehicle, identifies that there is no preceding vehicle). After that, the preceding vehicle information identifying part 332 identifies the speed of the identified preceding vehicle and the following distance between the identified preceding vehicle and the vehicle 100, based on the images captured by the external camera 12 or the distance information obtained by the distance measurement sensor 13.

The target speed setting part 333 receives, as input, the upper limit speed set by the upper limit speed setting part 331 and the preceding vehicle information identified by the preceding vehicle information identifying part 332. The target speed setting part 333 performs target speed setting processing, based on such input information, to thereby output the target speed of the vehicle 100 at that point of time. Details of the target speed setting processing will be explained later.

The speed control part 334 receives, as input, the amounts of depression of the accelerator pedal and the brake pedal detected by the pedal sensor 15 and the target speed set by the target speed setting part 333. The speed control part performs the speed control processing based on such input information, and thereby outputs control commands to the vehicle actuators 20. Details of the speed control processing will be explained later.

Target Speed Setting Processing

Next, the target speed setting processing performed by the target speed setting part 333 will be explained. In the present embodiment, the target speed setting part 333 basically sets the target speed of the vehicle 100 to the upper limit speed. However, if there is a preceding vehicle present in the running lane in which the vehicle 100 is running, the target speed setting part 333 controls the target speed of the vehicle 100 so as to follow the preceding vehicle. In particular, in the present embodiment, if the following distance between the vehicle 100 and the preceding vehicle is longer than the target following distance, the target speed setting part 333 sets the target speed of the vehicle 100 to a speed faster than the speed of the preceding vehicle. On the other hand, if the following distance between the vehicle 100 and the preceding vehicle is shorter than the target following distance, the target speed setting part 333 sets the target speed of the vehicle 100 to a speed slower than the speed of the preceding vehicle. However, if the target speed of the vehicle 100 set in this way is faster than the upper limit speed, the target speed setting part 333 sets the target speed of the vehicle 100 at the upper limit speed. Therefore, the target speed setting part 333 sets the target speed of the vehicle 100 to less than or equal to the upper limit speed, based on the running environment of the vehicle 100.

Note that, in the present embodiment, the target speed setting part 333 sets the target speed of the vehicle 100 based on the running situation of the preceding vehicle. However, the target speed setting part 333 may also set the target speed of the vehicle 100, based on a running environment other than the running situation of the preceding vehicle as long as the target speed of the vehicle 100 is less than or equal to the upper limit speed. For example, if the curvature of the curve on which the vehicle 100 is running is large, the target speed may also be set so that the larger the curvature, the slower the target speed becomes.

Figure 4:
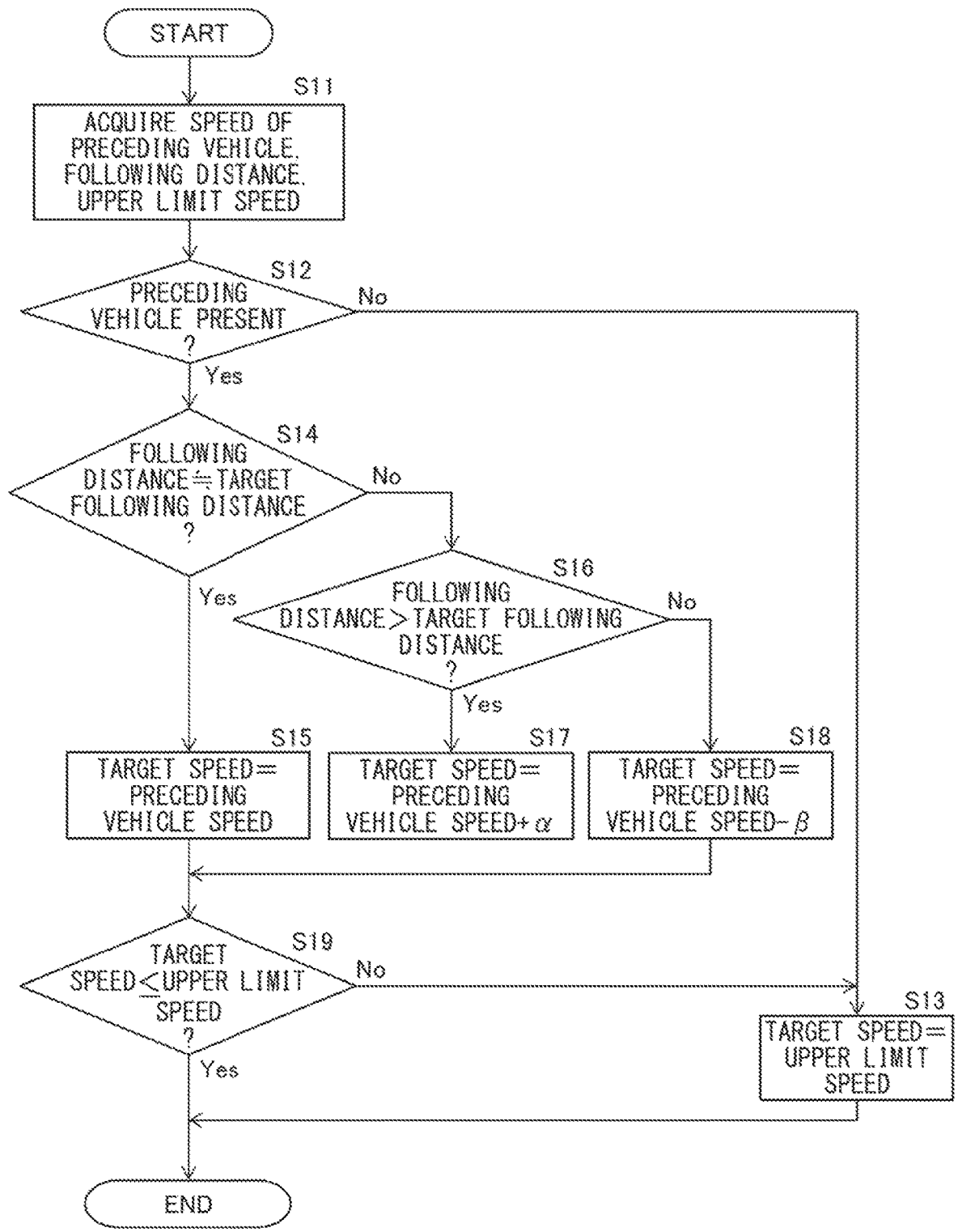
FIG. 4 is a flow chart showing a flow of target speed
setting processing performed by a target speed setting part.

FIG. 4 is a flow chart showing a flow of the target speed setting processing performed by the target speed setting part 333. The illustrated processing is repeatedly performed every constant time interval during performance of the automatic speed control processing.

The target speed setting part 333, first, acquires the preceding vehicle information (presence of any preceding vehicle, speed of the preceding vehicle, and following distance with the preceding vehicle) and the upper limit speed (step S11). The target speed setting part 333 acquires the preceding vehicle information from the preceding vehicle information identifying part 332, and acquires the upper limit speed from the upper limit speed setting part 331.

Next, the target speed setting part 333 judges if there is a preceding vehicle present in the running lane on which the vehicle 100 is running, based on the preceding vehicle information acquired at step S11 (step S12). If at step S12 it is judged that there is no preceding vehicle present in the running lane on which the vehicle 100 is running, the target speed setting part 333 sets the target speed of the vehicle 100 at the upper limit speed calculated by the upper limit speed setting part 331 (step S13).

On the other hand, if at step S12 it is judged that there is a preceding vehicle present in the running lane on which the vehicle 100 is running, the target speed setting part 333 judges if the following distance between the vehicle 100 and the preceding vehicle is substantially the same as the target following distance (step S14). The target following distance may be a preset constant value or may be a constant value preset by the driver. Further, the target following distance may also be a value changing in accordance with a parameter such as the speed of the vehicle 100 (for example, the target following distance becomes longer as the speed of the vehicle 100 becomes faster).

If at step S14 it is judged that the following distance between the vehicle 100 and the preceding vehicle is substantially the same as the target following distance, the target speed setting part 333 sets the target speed at a speed substantially the same as the speed of the preceding vehicle (step S15).

On the other hand, if at step S14 it is judged that the following distance between the vehicle 100 and the preceding vehicle differs from the target following distance, the target speed setting part 333 judges if the following distance is longer than the target following distance (step S16). If at step S16 it is judged that the following distance is longer than the target following distance, the target speed setting part 333 sets target speed to a speed faster than the speed of the preceding vehicle (step S17). On the other hand, if at step S16 it is judged that the following distance is shorter than the target following distance, the target speed setting part 333 sets the target speed at a speed slower than the speed of the preceding vehicle (step S18).

If at steps S15, S17, and S18 the target speed is set based on the speed of the preceding vehicle, the target speed setting part 333 judges if the set target speed is less than or equal to the upper limit speed set by the upper limit speed setting part 331 (step S19). If it is judged that the set target speed is less than or equal to the upper limit speed, the target speed is maintained without change. On the other hand, if at step S19 it is judged that the set target speed is faster than the upper limit speed, the target speed setting part 333 resets the target speed to the upper limit speed (step S13).

Speed Control Processing

Next, the speed control processing performed by the speed control part 334 will be explained. In the present embodiment, the speed control part 334 basically controls the speed of the vehicle 100 so that the speed of the vehicle 100 becomes the target speed set by the target speed setting processing. However, when the accelerator pedal of the vehicle 100 is depressed, the speed control part 334 controls the speed of the vehicle 100 so that, regardless of the target speed, the vehicle 100 accelerates by an acceleration degree corresponding to the amount of depression of the accelerator pedal detected by the pedal sensor 15. On the other hand, in the present embodiment, when the brake pedal of the vehicle 100 is depressed, the speed control part 334 makes the automatic speed control processing end.

Figure 5:
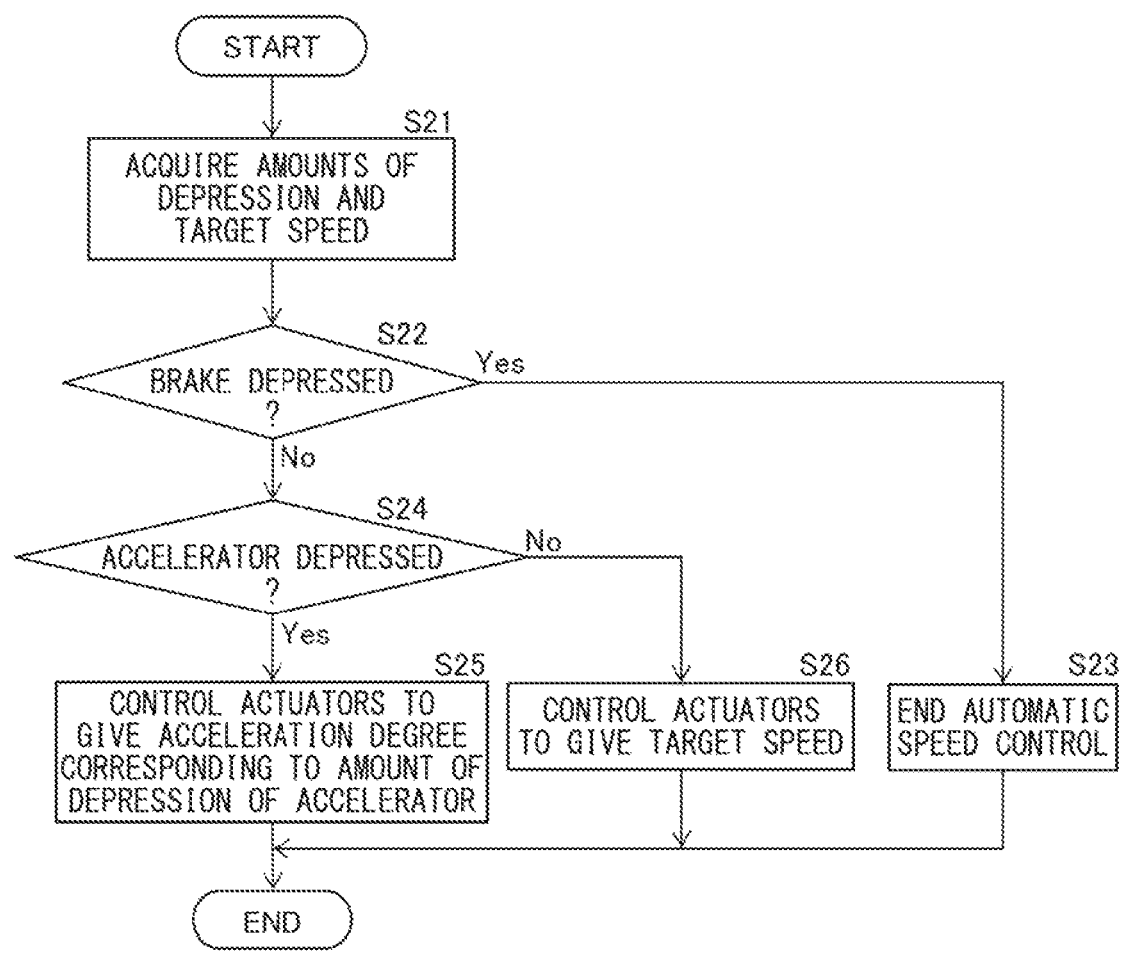
FIG. 5 is a flow chart showing a flow of speed control
processing performed by a speed control part.

FIG. 5 is a flow chart showing the flow of speed control processing performed by the speed control part 334. The illustrated processing is repeatedly performed every constant time interval, while automatic speed control processing is being performed.

The speed control part 334, first, acquires the amount of depression of the accelerator pedal, the amount of depression of the brake pedal, and the target speed (step S21). The speed control part 334 acquires the amount of depression of the accelerator pedal and the amount of depression of the brake pedal from the pedal sensor 15, and acquires the target speed from the target speed setting part 333.

Next, the speed control part 334 judges if the brake pedal is being depressed by the driver, based on the amount of depression of the brake pedal acquired from the pedal sensor 15 (step S22). If at step S22 it is judged that the brake pedal is being depressed, the speed control part 334 makes the automatic speed control processing end (step S23). Therefore, the upper limit speed setting processing, the preceding vehicle information identifying processing, the target speed setting processing, and the speed control processing are suspended, and the speed of the vehicle 100 is controlled by the driver operating the accelerator pedal and the brake pedal.

If at step S22 it is judged that the brake pedal is not being depressed, the speed control part 334 judges if the accelerator pedal is being depressed by the driver based on the amount of depression of the accelerator pedal obtained from the pedal sensor 15 (step S24). If at step S24 it is judged that the accelerator pedal is being depressed, the speed control part 334 controls the vehicle actuators 20 so as to obtain an acceleration degree corresponding to the amount of depression of the accelerator pedal by the target speed setting part 333 regardless of the set target speed (step S25). Therefore, if an internal combustion engine is used for driving the vehicle 100, the speed control part 334 enlarges the throttle opening degree of the internal combustion engine to increase the output of the internal combustion engine as the amount of depression of the accelerator pedal is larger. Further, if an electric motor is used for driving the vehicle 100, the speed control part 334 makes the electric power supplied to the electric motor increase to increase the output of the electric motor as the amount of depression of the accelerator pedal is larger.

On the other hand, if at step S24 it is judged that accelerator pedal is not being depressed, the speed control part 334 controls the vehicle actuators 20 so that the speed of the vehicle 100 detected by the running condition sensor 11 becomes the target speed (step S26). Therefore, if the speed of the vehicle 100 is slower than the target speed, the speed control part 334 controls the vehicle actuators 20 so as to make the vehicle 100 accelerate. Further, if the speed of the vehicle 100 is faster than the target speed, the speed control part 334 controls the vehicle actuators 20 so as to make the vehicle 100 decelerate.

Upper Limit Speed Setting Processing

Next, the upper limit speed setting processing performed by the upper limit speed setting part 331 will be explained. Here, the upper limit speed is the maximum value which the target speed of the vehicle 100 can take when automatic speed control processing is being performed. Therefore, in the above-mentioned target speed setting processing, the target speed of the vehicle 100 is set by the upper limit speed setting processing to less than or equal to the set upper limit speed.

In the present embodiment, when the vehicle 100 is running on a main road of the motorway, the upper limit speed setting part 331 sets the driver set upper limit speed (first speed) set by the driver as the upper limit speed. The driver set speed is a speed preset by the driver through the HMI 17 and is for example 80 to 100 km/h.

Further, in the present embodiment, when the vehicle 100 is running on a connecting road of the motorway, the upper limit speed setting part 331 sets the connecting road upper limit speed (second speed) slower than the driver set speed, as the upper limit speed. The connecting road upper limit speed is a predetermined constant speed and is, for example, 60 km/h. Note that, the connecting road upper limit speed may be changed in accordance with the driver set upper limit speed. In this case, the faster the driver set upper limit speed, the faster the connecting road upper limit speed also becomes, but in this case as well, the connecting road upper limit speed is set to a speed slower than the driver set upper limit speed.

Note that, a "connecting road of a motorway" means a road branching off from a main road of a motorway and connecting to another main road, or a road branching off from a main road of a motorway and connecting to an exit to an ordinary road (for example, a toll booth). Therefore, a starting point of the connecting road is, for example, a point where a branching lane starts at an interchange, junction, or the like of a motorway (or a point where a branching lane ends and completely separates from the main road) or an entrance of a road connected to the main road from the ordinary road (for example, a toll booth). Further, an end point of the connecting road is, for example, a point where a merging lane starts at an interchange, junction or the like of a motorway (or a point where a merging lane ends and is completely incorporated into the main roads) or an exit of the road branched from the main road to an ordinary road (for example, toll booth).

Here, in general, in a connecting road of a motorway, compared with a main road, the curvature of the curve is larger and the road width is smaller. Therefore, if the upper limit speed at a connecting road is the same as the upper limit speed at a main road, there is a possibility that the speed on the connecting road will be too fast and the driver will feel uneasy. In contrast, in the present embodiment, by setting the upper limit speed at a connecting road to a connecting road upper limit speed slower than the driver set upper limit speed, the driver is kept from feeling uneasy while running on this connecting road.

Further, in the present embodiment, as explained above, if the driver depresses the accelerator pedal, the speed control part 334 makes the vehicle 100 accelerate in accordance with the amount of depression of the accelerator pedal. Therefore, in this case, the speed of the vehicle 100 will sometimes become faster than the upper limit speed. In the present embodiment, regardless of the type of road on which the vehicle 100 is running, the upper limit speed setting part 331 will not set the upper limit speed to a speed faster than the driver set speed even when the speed of the vehicle 100 is faster than the driver set speed due to the accelerator pedal being depressed. Therefore, for example, even if the speed of the vehicle 100 becomes faster than the driver set speed due to the driver depressing the accelerator pedal while running on a main road of a motorway, the upper limit speed is maintained as the driver set speed. Therefore, if the driver stops depressing the accelerator pedal, the target speed of the vehicle 100 will become the driver set speed, and thus the speed of the vehicle 100 will gradually decelerate toward the driver set speed.

On the other hand, when the vehicle 100 is running on a connecting road, if the accelerator pedal is depressed to cause the speed of the vehicle 100 to become faster than the connecting road upper limit speed, the upper limit speed setting part 331 sets the upper limit speed while running on this connecting road to the speed at which the vehicle 100 is running. Therefore, at this time, the speed of the vehicle 100 is set to a speed faster than the connecting road upper limit speed. However, in this case as well, as explained above, the upper limit speed is set to less than or equal to the driver set speed. Therefore, when the vehicle 100 is running on a connecting road, even if the accelerator pedal being depressed causes the speed of the vehicle 100 to become faster than the driver set speed, the upper limit speed is set to the driver set speed. Therefore, it can be said that when the vehicle 100 is running on a connecting road, if the accelerator pedal being depressed causes the speed of the vehicle 100 to become faster than the connecting road upper limit speed, the upper limit speed setting part 331 sets the upper limit speed to a speed faster than the connecting road upper limit speed and less than or equal to the driver set speed.

As explained above, on a connecting road, basically the upper limit speed is set to a relatively slow speed. Therefore, the driver will sometimes feel the speed of the vehicle 100 at the connecting road is slow and depress the accelerator pedal to increase the speed of the vehicle 100. In such a case, if the upper limit speed is maintained to be set to the connecting road upper limit speed, the speed of the vehicle 100 will return to the connecting road upper limit speed when the driver stops depressing the accelerator pedal. For this reason, if the driver tries to maintain the speed of the vehicle 100 at a speed faster than the connecting road upper limit speed, the driver will have to continue depressing the accelerator pedal, and the automatic control function of the vehicle speed will not be able to be sufficiently utilized. In contrast, according to the present embodiment, when the accelerator pedal is depressed while running on the connecting road to cause the speed of the vehicle 100 to become faster than the connecting road upper limit speed, since the upper limit speed while the vehicle is running on this connecting road is set to a speed faster than the connecting road upper limit speed, the driver will no longer have to continue depressing the accelerator pedal, and the automatic control function of the vehicle speed will be able to be sufficiently utilized.

In this regard, by the upper limit speed when the vehicle 100 is running on a connecting road being set in this way, if the accelerator pedal is depressed when the vehicle 100 is running on a connecting road and the speed of the vehicle 100 becomes faster than the connecting road upper limit speed, after that, even if the driver stops depressing the accelerator pedal, the speed of the vehicle 100 will be maintained at a speed faster than the connecting road upper limit speed. On the other hand, when the vehicle 100 is running on a connecting road, even if the upper limit speed is set to a speed faster than the connecting road upper limit speed and the speed of the vehicle 100 is faster than the connecting road upper limit speed, for example, if the preceding vehicle appearing in front of the vehicle 100 is slower than the connecting road upper limit speed, the speed of the vehicle 100 is decreased to a speed slower than the connecting road upper limit speed matching the speed of the preceding vehicle in order for the vehicle 100 to follow this preceding vehicle. Alternatively, in the case where the target speed is set so that if the curvature of the road on which the vehicle 100 runs is large, the larger the curvature, the slower the target speed, if the vehicle 100 runs on a connecting road with a large curvature, the target speed will temporarily be set slow. As a result, the speed of the vehicle 100 will sometimes be decreased to a speed slower than the connecting road upper limit speed. In the present embodiment, when the upper limit speed setting part 331 sets the upper limit speed to a speed faster than the connecting road upper limit speed while the vehicle 100 is running on a connecting road and then the speed of the vehicle 100 falls to less than or equal to the connecting road upper limit speed while the vehicle 100 is running on this connecting road, the upper limit speed setting part 331 lowers the upper limit speed to the connecting road upper limit speed. Therefore, in the present embodiment, if the speed of the vehicle 100 is decreased to less than or equal to the connecting road upper limit speed, the upper limit speed is also lowered to the connecting road upper limit speed, and thus the upper limit speed is kept from continuing being maintained at a speed faster than the connecting road upper limit speed while the vehicle 100 is running on the connecting road.

Furthermore, when the vehicle 100 is running on a connecting road, if the speed of the vehicle 100 to fall to less than or equal to a reacceleration upper limit speed (third speed) slower than the connecting road upper limit speed (second speed) by, for example, following a slow preceding vehicle, the upper limit speed setting part 331 sets the upper limit speed to the reacceleration upper limit speed. The reacceleration upper limit speed is a predetermined constant speed, for example, 50 km/h. Note that, the reacceleration upper limit speed may also change in accordance with the driver set upper limit speed. In this case, the faster the driver set upper limit speed, the faster the reacceleration upper limit speed also becomes, but in this case as well, the reacceleration upper limit speed is set to a speed slower than the connecting road upper limit speed. By setting the speed to the reacceleration upper limit speed in this way, for example, if the vehicle 100 is decelerated by following a slow preceding vehicle in front of the vehicle 100 and then the preceding vehicle disappears, the speed of the vehicle 100 will no longer rise up to the connecting road upper limit speed.

In addition, when the vehicle 100 is running on a connecting road heading to an exit of the motorway and the speed of the vehicle 100 falls to less than or equal to an exit upper limit speed (fourth speed) slower than the connecting road upper limit speed (second speed), the upper limit speed setting part sets the upper limit speed to the exit upper limit speed. The exit upper limit speed is a predetermined constant speed, for example, 40 km/h. In particular, in the present embodiment, the exit upper limit speed is set to a speed slower than the reacceleration upper limit speed. Note that, the exit upper limit speed may also change in accordance with the driver set upper limit speed. In this case, the faster the driver set upper limit speed, the faster the exit upper limit speed also becomes, but in this case as well, the exit upper limit speed is set to a speed slower than the connecting road upper limit speed.

Here, there is a toll booth at the exit of the motorway, therefore it is necessary to make the speed of the vehicle 100 greatly decrease near the exit. Further, even if there is no toll booth at the exit of the motorway, it is necessary to make the speed of the vehicle 100 decrease at the ordinary road following the exit of the motorway. Therefore, near the exit of the motorway, it is necessary to make the speed of the vehicle 100 decrease. According to the present embodiment, by setting the upper limit speed when running on a connecting road heading toward an exit of the motorway to an exit upper limit speed slower than the connecting road upper limit speed, it is possible to lower the speed of the vehicle 100 to match with the situation on the road without any odd feeling.

Figure 6:
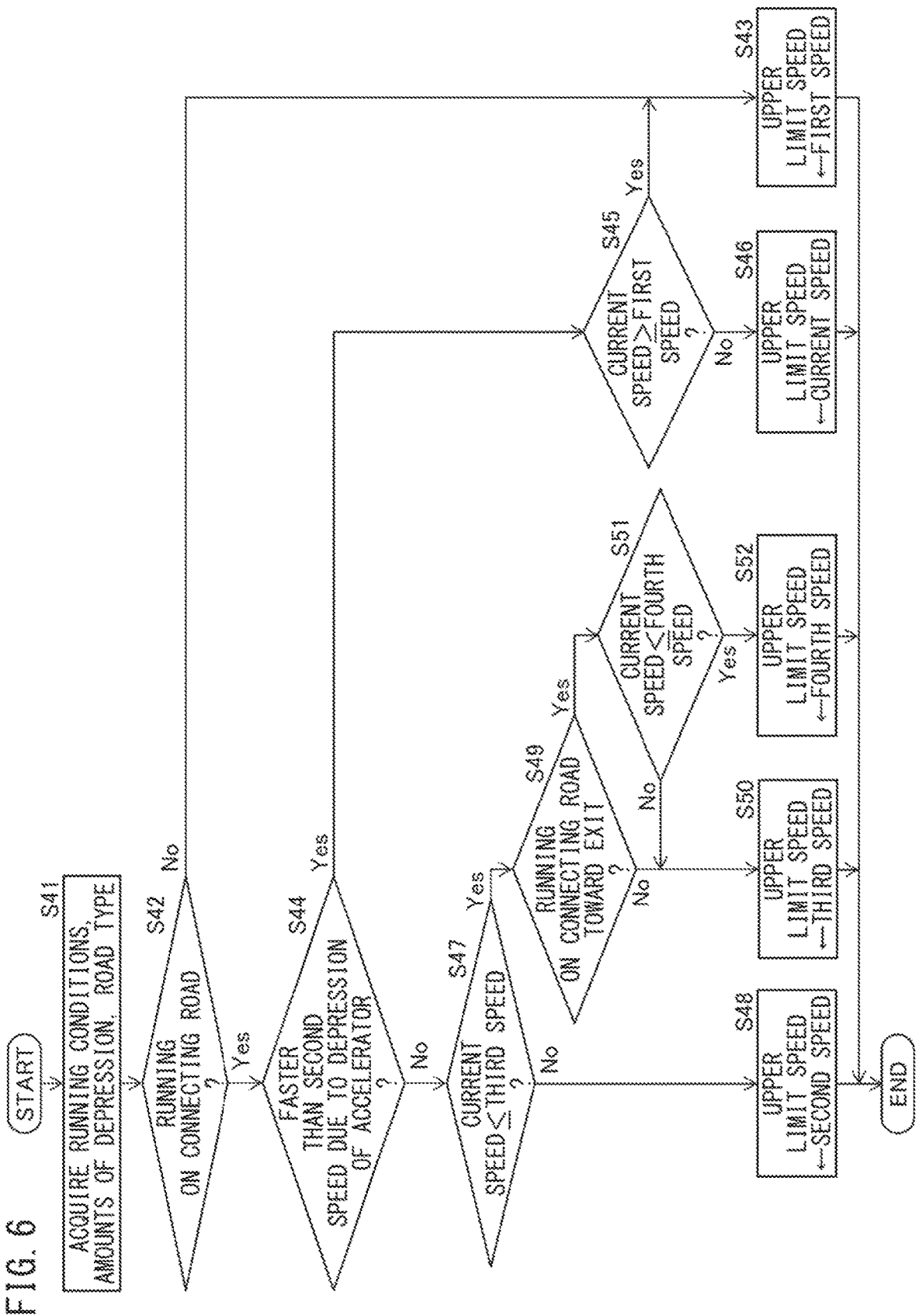
FIG. 6 is a flow chart showing a flow of upper limit speed
setting processing performed by an upper limit speed setting
part.

FIG. 6 is a flow chart showing a flow of the upper limit speed setting processing performed by the upper limit speed setting part 331. The illustrated processing is repeatedly performed every constant time interval, while the automatic speed control processing is being performed.

The upper limit speed setting part 331, first, acquires the running condition of the vehicle 100, in particular, the current speed of the vehicle 100, amount of depression of the accelerator pedal, and type of road on which the vehicle 100 is currently running (step S41). The upper limit speed setting part 331 acquires the current speed of the vehicle from the running condition sensor 11, and acquires the amount of depression of the accelerator pedal from the pedal sensor 15. Further, the upper limit speed setting part 331 acquires the self-position information from the position measurement sensor 14 and acquires map information from the storage device 16, and identifies the type of road on which the vehicle 100 is currently running based on such information. Specifically, the upper limit speed setting part 331 identifies which of a main road of a motorway or a connecting road of a motorway the road being run on is. In addition, when the road being run on is a connecting road of a motorway, the upper limit speed setting part 331 identifies if that connecting road is a connecting road heading to an exit of the motorway. The upper limit speed setting part 331 acquires the type of road identified in this way as the type of road on which the vehicle 100 is currently running on.

Next, the upper limit speed setting part 331 judges if the road on which the vehicle 100 is currently running is a connecting road (step S42). If at step S42 it is judged that the road on which the vehicle 100 is currently running is not a connecting road, that is, is a main road, the upper limit speed setting part 331 sets the upper limit speed of the vehicle 100 to the driver set upper limit speed (first speed) (step S43). Therefore, when the vehicle 100 is running on a main road, in the present embodiment, basically, the upper limit speed is set to the driver set upper limit speed.

On the other hand, if at step S42 it is judged that the road on which the vehicle 100 is currently running is a connecting road, the upper limit speed setting part 331 judges if the speed of the vehicle 100 has become faster than the connecting road upper limit speed (second speed) due to the driver depressing the accelerator pedal (step S44). If at step S44 it is judged that the speed of the vehicle 100 has become faster than the connecting road upper limit speed (second speed) due to the driver depressing the accelerator pedal, the upper limit speed setting part 331 judges if the current speed of the vehicle 100 is greater than or equal to the driver set upper limit speed (first speed) (step S45). If at step S45 it is judged that the current speed of the vehicle 100 is the driver set upper limit speed or more, the upper limit speed setting part 331 sets the upper limit speed of the vehicle 100 at the driver set upper limit speed (step S43). On the other hand, if at step S45 it is judged that the current speed of the vehicle 100 is slower than the driver set upper limit speed, the upper limit speed setting part 331 sets the upper limit speed of the vehicle 100 at the current speed of the vehicle 100 (step S46). As a result, if the speed of the vehicle 100 becomes faster than the connecting road upper limit speed due to the accelerator pedal being depressed while running on this connecting road, the upper limit speed is set to a speed faster than the connecting road upper limit speed, with the driver set upper limit speed as the upper limit.

If at step S44 it is judged that the speed of the vehicle 100 has not become faster than the connecting road upper limit speed (second speed) due to the accelerator pedal being depressed, the upper limit speed setting part 331 judges if the current speed of the vehicle 100 is less than or equal to a reacceleration upper limit speed (third speed) slower than the connecting road upper limit speed (step S47). If at step S47 it is judged that the current speed of the vehicle 100 is faster than the reacceleration upper limit speed, the upper limit speed setting part 331 sets the upper limit speed of the vehicle 100 to the connecting road upper limit speed (step S48).

On the other hand, if at step S47 it is judged that the current speed of the vehicle 100 is less than or equal to the reacceleration upper limit speed (third speed), the upper limit speed setting part 331 judges if the connecting road on which the vehicle 100 is running is a connecting road heading to an exit (step S49). If at step S49 it is judged that the connecting road on which the vehicle 100 is running is not a connecting road heading to an exit, the upper limit speed setting part 331 sets the upper limit speed of the vehicle 100 to the reacceleration upper limit speed (step S50).

If at step S49 it is judged that the connecting road on which the vehicle 100 is running is a connecting road heading to an exit, the upper limit speed setting part 331 judges if the current speed of the vehicle 100 is less than or equal to an exit upper limit speed (fourth speed) slower than the reacceleration upper limit speed (third speed) (step S51). If at step S51 it is judged that the current speed of the vehicle 100 is faster than the exit upper limit speed, the upper limit speed setting part 331 sets the upper limit speed of the vehicle 100 to the reacceleration upper limit speed (step S50). On the other hand, if at step S51 it is judged that the current speed of the vehicle 100 is less than or equal to the exit upper limit speed, the upper limit speed setting part 331 sets the upper limit speed of the vehicle 100 to the exit upper limit speed.

Therefore, in the present embodiment, when the vehicle 100 is running on the connecting road and the speed of the vehicle 100 has not become faster than the connecting road upper limit speed due to the accelerator pedal being depressed, the upper limit speed of the vehicle 100 is set to a speed less than or equal to the connecting road upper limit speed in accordance with the current speed of the vehicle 100 and the type of the connecting road on which the vehicle 100 is running.

Above, preferred embodiments according to the present invention were explained, but the present invention is not limited to these embodiments and can be corrected and changed in various ways within the language of the claims.

The invention claimed is:

1. An automatic speed control device for automatically controlling a speed of a vehicle, the automatic speed control device comprising a processor,
the processor being configured to:
set a first speed as an upper limit speed when the vehicle is running on a main road of a motorway and set a second speed slower than the first speed as the upper limit speed when the vehicle is running on a connecting road of the motorway;
set a target speed to less than or equal to the upper limit based on a running environment of the vehicle; and
control the speed of the vehicle so as to become the target speed, wherein
the processor is configured to control the speed of the vehicle so that when an accelerator pedal of the vehicle is depressed, the vehicle accelerates by an acceleration degree corresponding to an amount of depression of the accelerator pedal regardless of the target speed,
the processor is configured to set the upper limit speed while running on the connecting road to a speed faster than the second speed and less than or equal to the first speed when the speed of the vehicle has become faster than the second speed due to the accelerator pedal being depressed when the vehicle is running on the connecting road, and
when the speed of the vehicle exceeds the first speed while running on the connecting road due to the accelerator pedal being depressed, the processor is configured to set the upper limit speed for running on the connecting road to the first speed that is set as the upper limit speed for running on the main road.

2. The automatic speed control device according to claim 1, wherein the processor is configured, when the processor sets the upper limit speed to the speed faster than the second speed while the vehicle is running on the connecting road and then the speed of the vehicle falls to less than or equal to the second speed while the vehicle is running on the connecting road, to lower the upper limit speed to the second speed.

3. The automatic speed control device according to claim 1, wherein the processor is configured to set the upper limit speed to a third speed slower than the second speed when the speed of the vehicle falls to less than or equal to the third speed when the vehicle is running on the connecting road.

4. The automatic speed control device according to claim 3, wherein
the vehicle is a vehicle in which automatic control of the speed of the vehicle is stopped at an exit of the motorway,
the processor is configured to set the upper limit speed to a fourth speed slower than the second speed when the speed of the vehicle falls to less than or equal to the fourth speed when the vehicle is running on the connecting road heading to the exit, and
the fourth speed is slower than the third speed.

5. The automatic speed control device according to claim 1, wherein the vehicle is a vehicle in which automatic control of the speed of the vehicle is stopped at an exit of the motorway, and the processor is configured to set the upper limit speed to a fourth speed slower than the second speed, when the speed of the vehicle falls to less than or equal to the fourth speed when the vehicle is running on the connecting road heading to the exit.

6. The automatic speed control device according to claim 1, wherein the processor is configured not to set the upper limit speed to a speed faster than the first speed regardless of a type of road on which the vehicle is running, even when the speed of the vehicle has become faster than the first speed due to the accelerator pedal being depressed.

7. An automatic speed control method for automatically controlling a speed of a vehicle, the automatic speed control method comprising:

setting a first speed as an upper limit speed when the vehicle is running on a main road of a motorway, and setting a second speed slower than the first speed as the upper limit speed when the vehicle is running on a connecting road of the motorway;

setting a target speed to less than or equal to the upper limit based on a running environment of the vehicle; and controlling the speed of the vehicle so as to become the target speed, wherein the speed of the vehicle is controlled so that when an accelerator pedal of the vehicle is depressed, the vehicle accelerates by an acceleration degree corresponding to an amount of depression of the accelerator pedal regardless of the target speed, the upper limit speed while running on the connecting road is set to a speed faster than the second speed and less than or equal to the first speed when the speed of the vehicle has become faster than the second speed due to the accelerator pedal being depressed when the vehicle is running on the connecting road, when the speed of the vehicle exceeds the first speed while running on the connecting road due to the accelerator pedal being depressed, the upper limit speed for running on the connecting road is set to the first speed that is set as the upper limit speed for running on the main road.

8. A non-transitory computer readable medium having recorded thereon a computer program for automatically controlling a speed of a vehicle, the computer program causing a computer to execute a process comprising:

setting a first speed as an upper limit speed when the vehicle is running on a main road of a motorway, and setting a second speed slower than the first speed as the upper limit speed when the vehicle is running on a connecting road of the motorway;

setting a target speed to less than or equal to the upper limit based on a running environment of the vehicle;

controlling the speed of the vehicle so as to become the target speed;

controlling the speed of the vehicle so that when an accelerator pedal of the vehicle is depressed, the vehicle accelerates by an acceleration degree corresponding to an amount of depression of the accelerator pedal regardless of the target speed; and setting the upper limit speed while running on the connecting road to a speed faster than the second speed and less than or equal to the first speed when the speed of the vehicle has become faster than the second speed due to the accelerator pedal being depressed when the vehicle is running on the connecting road, wherein when the speed of the vehicle exceeds the first speed while running on the connecting road due to the accelerator pedal being depressed, the upper limit speed for running on the connecting road is set to the first speed that is set as the upper limit speed for running on the main road.

* * * * *